United States Patent [19]

Elsenheimer et al.

[11] Patent Number: 5,348,365
[45] Date of Patent: Sep. 20, 1994

[54] DEFORMING VEHICLE DOOR

[75] Inventors: Willi Elsenheimer, Florsheim; Hans-Dieter Zentgraf, Trebur, both of Fed. Rep. of Germany

[73] Assignee: General Motors Corporation, Detroit, Mich.

[21] Appl. No.: 125,726

[22] Filed: Sep. 24, 1993

[30] Foreign Application Priority Data

Oct. 15, 1992 [DE] Fed. Rep. of Germany ....... 4234799

[51] Int. Cl.$^5$ .............................................. B60R 27/00
[52] U.S. Cl. ................................ 296/146.6; 296/188
[58] Field of Search ...................... 296/146.6, 188, 189

[56] References Cited

U.S. PATENT DOCUMENTS

| | | | |
|---|---|---|---|
| 3,831,997 | 8/1974 | Myers | 296/189 |
| 3,909,058 | 9/1975 | Kramer et al. | 296/189 |
| 4,684,151 | 8/1987 | Drewek | 296/189 X |
| 4,702,515 | 10/1987 | Kato et al. | 296/189 |
| 5,118,160 | 6/1992 | Kitagawa et al. | 296/189 |
| 5,171,058 | 12/1992 | Ishikawa | 296/189 |
| 5,267,772 | 12/1993 | Ohta et al. | 296/189 |

FOREIGN PATENT DOCUMENTS 116268 7/1983 Japan ................ 296/189

*Primary Examiner*—Joseph D. Pape
*Attorney, Agent, or Firm*—Ernest E. Helms

[57] ABSTRACT

A vehicle door is designed to collapse in the longitudinal direction of the vehicle in such a way that in the case of a maximum longitudinal force slightly below that of the most serious accident, longitudinal deformation occurs and the axial supporting force of the vehicle door simultaneously remains as high as possible. To produce this longitudinal deformability, crimps running parallel in the vertical direction are provided in the structural members of the door and in a door well reinforcement.

1 Claim, 2 Drawing Sheets

DEFORMING VEHICLE DOOR

BACKGROUND OF THE INVENTION

The invention pertains to the configuration of the longitudinal side of a vehicle with a door formed between two supporting vertical columns. In the case of a front-end or rear-end collision of the motor vehicle, the door serves as a brace between the columns acting in the longitudinal direction.

For safety reasons, modern motor vehicles are usually designed in such a way that their passenger compartment is as stable as possible, and the regions in front of and behind the passenger compartment are designed as crumple zones. Since the door openings are bounded in the longitudinal direction in the lower region only by the side sills and in the upper region by the roof lips, the vehicle doors for safety reasons are designed in such a way that they represent a reinforcement for the longitudinal columns. In the case of a front collision, for example, the A columns are supposed to be supported via the two front doors on the B columns so that the A columns do not buckle inward and make the passenger compartment smaller and narrower, which is dangerous for the space occupied by the vehicle passengers.

In practice, it has been found that vehicle doors can withstand the load sustained in case of an accident without significant deformation up to a maximum peak force. In the case of extremely serious accidents, this peak force is exceeded and then the doors may buckle out at a significant weak point or in the region of the center of the door and then can no longer transmit forces acting in the longitudinal direction. As a result, the integrity of the passenger compartment may be compromised because the sills and the roof lips are then also overloaded and buckle inward or are more or less strongly deformed. The doors then also usually can, in some occasions, not be opened.

SUMMARY OF THE INVENTION

The goal of this invention is to solve the problem of designing a vehicle door in such a way that even in the most serious accidents, the lowest possible deformation of the passenger compartment occurs.

This problem is solved according to the invention by the fact that the vehicle door is designed to collapse in the longitudinal direction of the vehicle in such a way that this longitudinal deformation occurs only at the maximum longitudinal force, slightly below that of a most serious accident, and therefore the axial supporting force of the vehicle door still remains as high as possible.

This design of a vehicle door is in conflict with previous notions of safety. Until now, the vehicle doors were designed to be as stable as possible in order to provide additional support between the vertical columns of the vehicle body, even in the case of high forces acting in the longitudinal direction. As a result, the buckling out of the doors in the higher force ranges can be postponed but generally not avoided. The doors designed according to this invention act as a support until just before the occurrence of the maximum force, exactly the same as previously known doors. However, at the point at which conventional doors buckle out and thus become ineffective as supports, the vehicle doors according to this invention begin to deform in the longitudinal direction with a high opposing force. The vehicle doors according to this invention therefore, like conventional vehicle doors, cannot prevent deformation of the passenger compartment when the maximum force is exceeded, but as opposed to conventional doors, they hold it within narrow limits so that the risk to injury of the vehicle passengers is reduced.

An advantageous modification of this invention consists in the fact that the vehicle door is deformable in the longitudinal direction exclusively in its front region facing away from the door latch. In this way, even after the most serious accident, the door latch can still be activated and, therefore, the vehicle door can still be opened.

The longitudinal deformability can be achieved especially economically if, according to another modification of this invention, the longitudinal deformability is produced by crimps running in the vertical direction. However, other means are also possible such as are currently used for creating crumple zones in the front and rear regions of motor vehicles.

The geometric relationships in motor vehicles mean that in the case of a front-end or rear-end collision, the column-supporting forces are transmitted almost exclusively from the structural members of the door essentially at the level of the waist line of the motor vehicle. In contrast with this, the forces appearing in the case of a side collision always act in the lower third of the vehicle door. Therefore, it is advantageous in the case of a vehicle door that has door well reinforcements running in the longitudinal direction roughly at the level of the waist line if the door well reinforcement exhibits deformability in the longitudinal direction. Such a design makes it possible to arrange the conventional door stiffening elements in the lower third of the door in order to reduce the consequences of a side collision but without losing the sought after deformability in the longitudinal direction in the region of greatest importance for avoiding buckling as a result of such door stiffening elements.

Instead of achieving the sought deformability in the longitudinal direction by means of crimps, according to an advantageous modification, one can arrange a deformation member in the front region of the door well reinforcement. Such a deformation member can have a variety of designs. The decisive factor is that when a certain high force is exceeded, it causes a deformation with a constant but at least a high opposing force. Such deformation members are commonly used, e.g., on bumpers.

In order to prevent the vehicle door from bulging into the passenger compartment to an undesirably great distance in the case of a side collision, it is advantageous for the vehicle door to have as little stretchability as possible in the longitudinal direction.

BRIEF DESCRIPTION OF THE DRAWINGS

The invention permits numerous variants. One of them is shown in the drawings and is described as follows.

DESCRIPTION OF THE PREFERRED EMBODIMENTS

Figure 1:
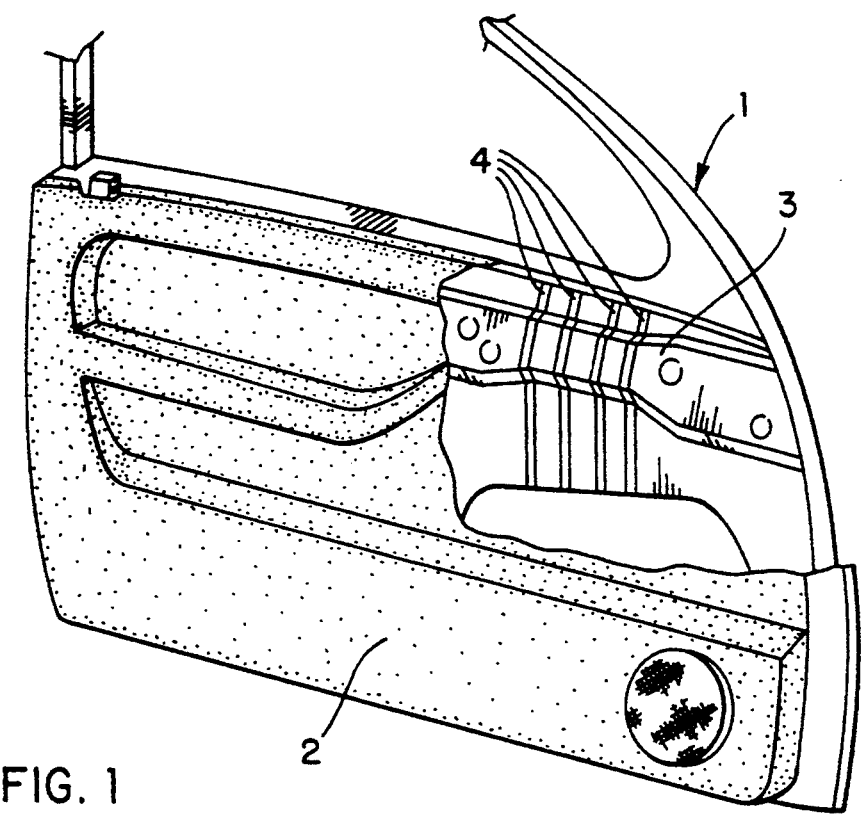
FIG. 1 is a partially cut away perspective view of a vehicle door according to this invention.

FIG. 1 shows a vehicle 1 with conventional door upholstery 2. Due to the partially cut away representation of the door upholstery 2, one can recognize a structural member of the door 3. To product a longitudinal deformation of this structural member of the door 3, several vertical crimps 4 are provided side by side in it. These crimps 4 cause the vehicle door 1 to collapse in the longitudinal direction with a high force of resistance in the case of a very severe accident instead of buckling outward as happens with conventional doors.

Figure 2:
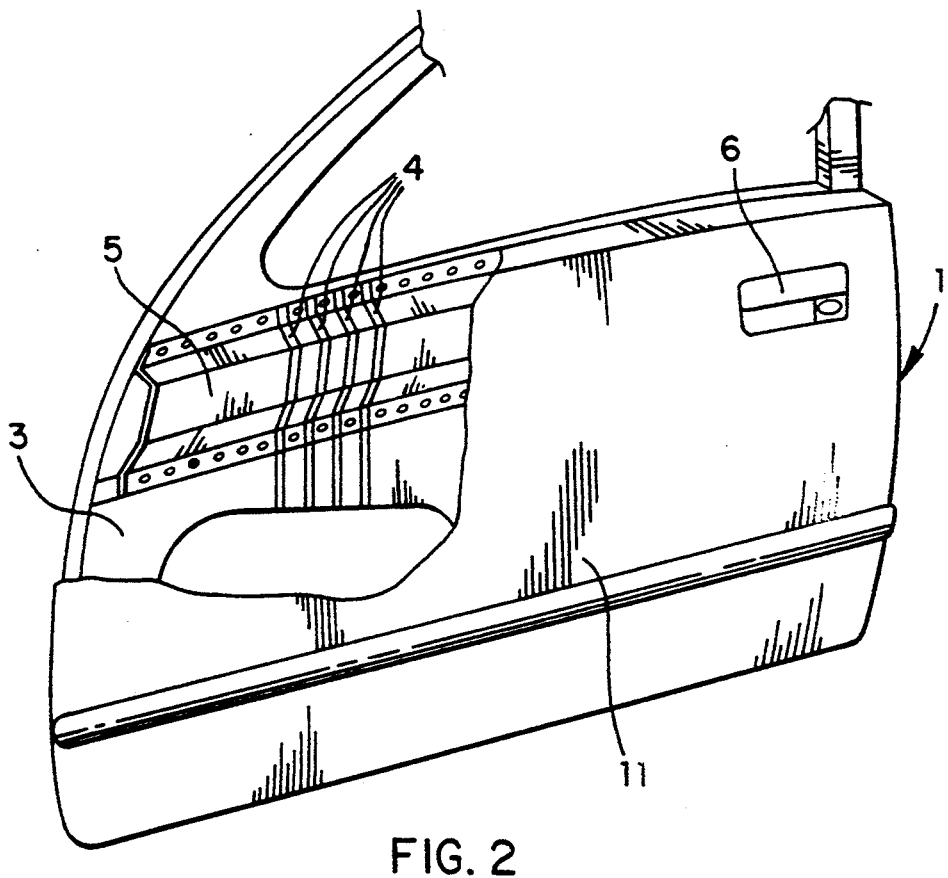
FIG. 2 shows the vehicle door from the outside.

FIG. 2 shows that the vehicle door 1 has, below an outer skin 11 on the outside on the structural member of the door 3 at the level of the waist line of the vehicle door 1, a door well reinforcement 5 running in the longitudinal direction. The crimps 4 are also provided in it. In FIG. 2, the handle of a door latch 6 can adjacent a rear end of the door can also be seen. The crimps 4 are located on the front side and therefore on the side of the vehicle door away from the door latch so that the door latch 6 is not made inoperative by axial deformations of the vehicle door 1.

Figure 3:
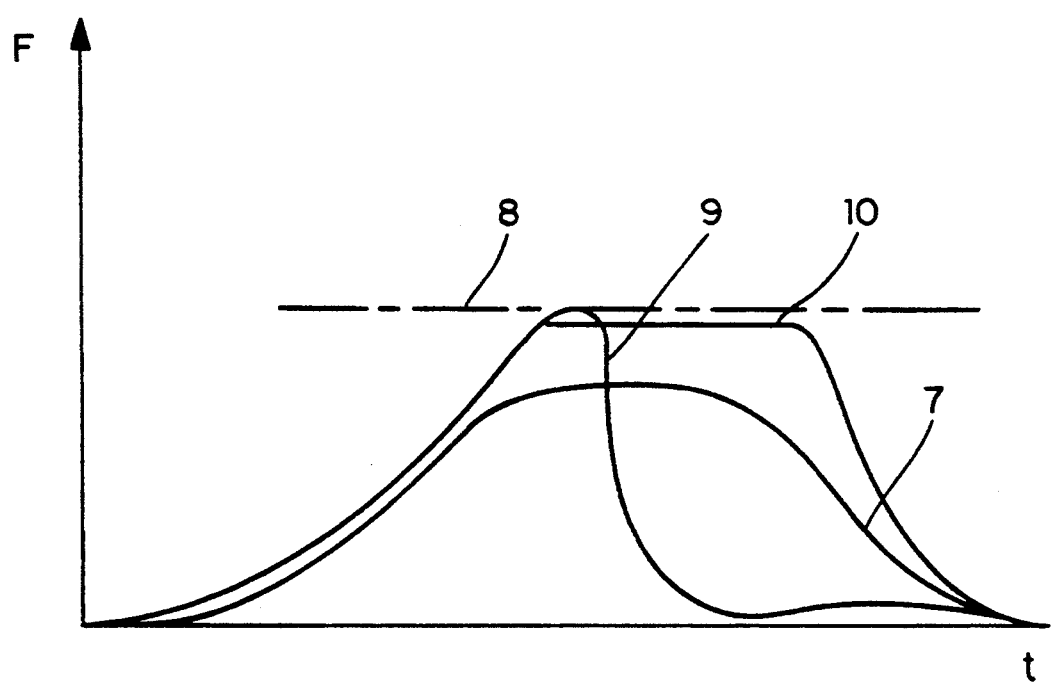
FIG. 3 is a diagram of the forces occurring in the door over time in the case of a crash.

In the diagram in FIG. 3, a curve 7 is plotted which corresponds to the force acting over time in a vehicle door in the case of a front end collision at 50 km/h. At a higher collision speed, this force exceeds a predetermined load limit 8 resulting from the strength of the vehicle door, as curve 9 is intended to show for a collision velocity of 55 km/h. Then, the initially explained uncontrolled strong deformation of the passenger compartment occurs because the vehicle door buckles out and accordingly can no longer transmit longitudinal forces (bracing force between the door pillars). Curve 10 shows that in the case of the vehicle door according to this invention, even at higher collision speeds the load limit 8 is not exceeded. Rather, the forces in the vehicle door remain slightly below this load limit 8, while the vehicle door deforms axially, and thus still represents a support for the columns of the vehicle connected by it.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A motor vehicle door which is designed for arrangement on a longitudinal side of the vehicle between two supporting vertical pillars and which, in the case of front-end or rear-end collision of the motor vehicle, serves as bracing means supplying a longitudinal bracing force in the longitudinal direction between the pillars, characterized in that the motor vehicle door having a latch adjacent a rear end and the door has a structural member extending generally along the length of the door, the door also having a forward region remote from the latch, the door also having a door channel reinforcement extending in the longitudinal direction approximately at the level of a waistline of a door, the structural member and the channel reinforcement having vertical crimps in the forward region of the door, to be compressible in the longitudinal direction of the vehicle in such a way that a deformation in the longitudinal direction of the door takes place only at slightly below a predetermined maximum longitudinal force occurring on the door in a very serious accident and at the same time the longitudinal bracing force of the motor vehicle door remains as high as possible and wherein longitudinal deformation of the door is exclusively in the front region remote from the door latch.

* * * * *